United States Patent [19]
Weidler

[11] Patent Number: 4,947,912
[45] Date of Patent: Aug. 14, 1990

[54] STUD OR WEB LINK FOR TIRE CHAINS

[75] Inventor: Erhard A. Weidler, Aalen-Unterkochen, Fed. Rep. of Germany

[73] Assignee: RUD-Kettenfabrik Rieger & Dietz GmbH U. Co., Aalen, Fed. Rep. of Germany

[21] Appl. No.: 203,246

[22] Filed: Jun. 6, 1988

[30] Foreign Application Priority Data

Jun. 11, 1987 [DE] Fed. Rep. of Germany ....... 3719751

[51] Int. Cl.$^5$ .......................... B60C 27/20; B60C 27/08
[52] U.S. Cl. ..................................... 152/243; 152/231; 59/78; 59/93
[58] Field of Search ............... 152/208, 210, 223, 225, 152/226, 227, 231, 243, 244; 59/78, 93

[56] References Cited
U.S. PATENT DOCUMENTS 2,728,371  6/1953  McCarthy ............................ 152/243
3,709,275  1/1973  Müller ................................. 152/243

FOREIGN PATENT DOCUMENTS 1996396  11/1968  Fed. Rep. of Germany .
1948717   4/1971  Fed. Rep. of Germany .

Primary Examiner—Merrell C. Cashion, Jr.
Assistant Examiner—Gregory J. Wilber
Attorney, Agent, or Firm—Mark P. Stone

[57] ABSTRACT

In a preferably edge-hardened or case-hardened stud link for tire chains, to increase the link surface a plurality of troughs (10) which are open on only two sides is arranged on the side faces (8, 9) of the ground-facing link part (1). The troughs (10) arranged in the region of the side faces (8, 9) can be supplemented by troughs (13) designed to resemble blind holes, which are arranged in the region of the contact face (11) and are open on only one side and which form chambers for receiving highly abrasive rock grains exerting a wear-inhibiting effect.

18 Claims, 1 Drawing Sheet

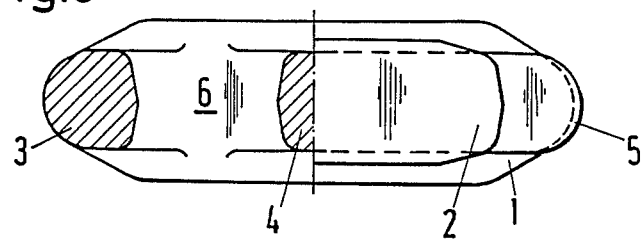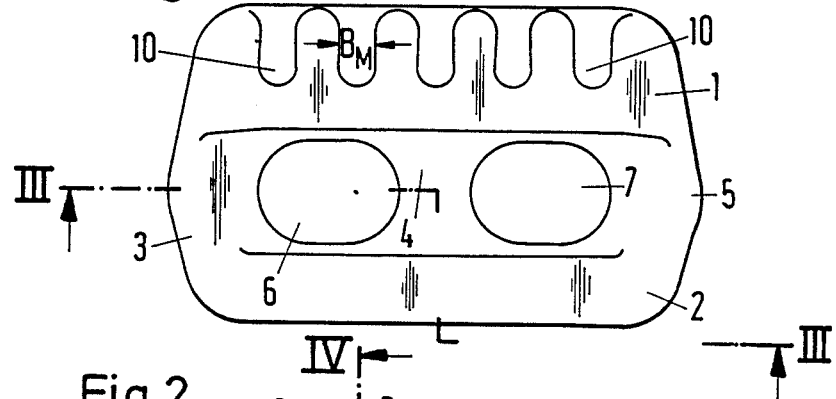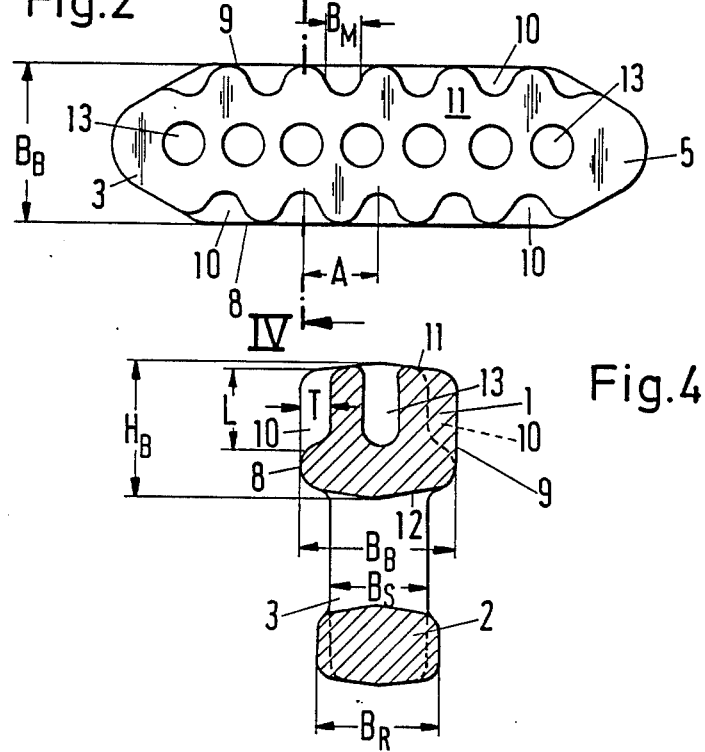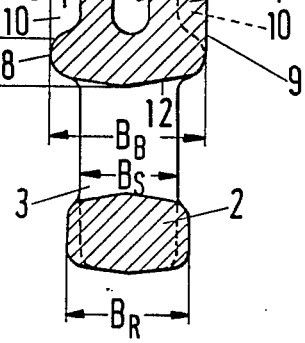

STUD OR WEB LINK FOR TIRE CHAINS

The invention relates to a stud or web link according to the preamble of patent claim 1.

BACKGROUND OF THE INVENTION

A stud link of the type under consideration is known from German Offenlegungsschrift 1,948,717. In the known stud link, the ground-facing link part, which is wider than the tire-facing link part, is equipped with two laterally projecting extensions serving for increasing the wearing volume of the ground-facing link part. Furthermore, in order to increase the grip, the surface of the known link confronting the ground has, immediately adjacent to the extensions, channel-shaped recesses which extend up to the side faces of the ground-facing link part, that is to say are open at both ends. These recesses serve for reducing the weight and for enlarging the case-hardened ground contact face of the link, this having a beneficial influence on the useful life of the link. Since the extensions of the known link project comparatively far beyond the side faces of the ground-facing link part, it is impossible to avoid forces exerted eccentrically under particular ground conditions. These forces seek to tilt the links and thus result in adverse loads both on the stud links and on the connecting links linked to these. At the same time, the laterally open recesses arranged in the immediate vicinity of the extensions are not very conductive to the design strength of the stud link.

SUMMARY OF THE INVENTION

The object on which the invention is based is to provide a stud or web link of the type under consideration, in which an especially balanced relationship between design strength and wear resistance is achieved means of a special surface structure. In a stud link of the relevant generic type, this object is achieved by means of the defining features of claim 1.

The link according to the invention affords the advantage of a wear resistance increased as a result of the enlargement of the preferably hardened surface, without the surface enlargement having to be at the expense of a reduction in the design strength, and without the need to increase the wearing volume by means of extensions promoting the introduction of tilting forces.

BRIEF DESCRIPTION OF THE DRAWINGS

Further features and details of the invention emerge from the subclaims and from the following description of a preferred exemplary embodiment illustrated in the accompanying drawing. In this:

FIG. 1 shows the side view of a stud link,
FIG. 2 shows the view of the stud link according to FIG. 1 from the ground or road;
FIG. 3 shows part of the stud link according to FIG. 1, as seen in the view from the tire, and a part section along the line III—III in FIG. 1, and
FIG. 4 shows a section along the line IV—IV in FIG 2.

DESCRIPTION OF THE BEST MODE FOR CARRYING OUT THE INVENTION

The stud link or web member illustrated in the drawing possesses a ground-facing link part 1 confronting the ground or road and a tire-facing link part 2 which confronts the tire and which is somewhat narrower than the ground-facing link part 1. The link parts 1 and 2 are connecting to one another by means of studs or webs 3, 4 and 5 which enclose receiving orifices 6 and 7 for the connection of connecting links. In practice, in the network of a tire chain, the stud links are oriented perpendicularly relative to the outer face of the tire, whereas the connecting links usually formed by rings are oriented parallel to the outer face of the tire.

Stud links of the type illustrated have to meet stringent requirements as regards their wearing resistance, breaking safety and fatigue strength. They are customarily edge-hardened or case-hardened, since full hardening not only involves an increased outlay in terms of labor and presupposes the use of more expensive steels, but also impairs the fatigue strength of the chain links.

To achieve high wearing resistance, the ground-facing link part 1 of the stud link is equipped, on its side faces 8 and 9, with troughs 10 which are arranged as corrugations and the depth T of which is preferably less than the mean width $B_M$ of the troughs 10, but at most equal to the distance A between every two successive troughs 10. The troughs 10 are closed on only three sides, that is to say are open not only laterally, but also at their ends confronting the contact face 11 of the link part 1. Because the length L of the troughs 10, although being greater than their mean width $B_M$, is less than the height H of the ground-facing link part 1, a smooth saddle-shaped supporting face 12, against which the connecting links suspended in the receiving orifices 6, 7 can be supported, is obtained. Instead of troughs 10 open onto the respective side face 8 or 9 and onto the contact face 11, there can also be pot-like troughs open only onto the respective side face. To keep the cross-section of the link part 1 approximately constant everywhere, the troughs 10 on the side face 8 are arranged offset relative to the troughs 10 on the side face 9, as can be seen from FIGS. 2 and 4.

Not only the open ends of the troughs 10, but also the ends of troughs 13 which are designed to resemble blind holes or be pot-like and the depth of which corresponds to the length L of the troughs 10 open onto the contact face 11 of the ground-facing link part 1. When chains equipped with stud links are used in highly abrasive rock, the provision of troughs 13 in the contact face 11 has a positive effect in as much as rock grains penetrate into the troughs 13, are compacted there and exert a wear-inhibiting effect as a result of their hardness which is greater than that of the stud links.

Because of the deliberate "fissuring" of the outer faces of the stud link which are exposed to particularly high wear, the hardened wearing volume can be enlarged, without a cost-intensive increase in the depths of hardening being required.

I claim:
1. A stud or web link for tire chains, with at least one receiving orifice for the connection of connecting links, with a tire-facing link part and with a ground-facing link part, wherein at least one side face (8,9) of the ground-facing link part (1) defines a plurality of troughs (10) extending substantially throughout the length of said at least one side face and serving for enlarging the side face (8,9), said ground-facing link part not including any lateral projections,
said troughs (10) arranged on the at least one side face (8,9) are open at their ends confronting the contact face (11), but closed at their ends confronting the at least one receiving orifice (6,7).

2. A link as claimed in claim 1, wherein there are two side faces and troughs (10) formed as corrugations are arranged on both side faces (8,9).

3. A stud or web link for tire chains, with at least one receiving orifice for the connection of connecting links, with a tire-facing link part and with a ground-facing link part, wherein side faces (8,9) of the ground-facing link part (1) are mutually opposite and define a plurality of troughs (10) serving for enlarging the side faces (8,9), said ground-facing link part not including any lateral projections, wherein the troughs (10) located on said opposite side faces (8,9) are arranged offset relative to one another.

4. A link as claimed in claim 1 wherein its ground facing link part has a contact face (11) confronting the ground and is equipped with a plurality of troughs (13).

5. A link as claimed in claim 4 wherein the troughs (13) in the contact face are closed on at least three sides.

6. A stud or web link for tire chains, with at least one receiving orifice for the connection of connecting links, with a tire-facing link part and with a ground-facing link part, wherein at least one side face (8,9) of the ground-facing link part (1) defines a plurality of troughs (10) serving for enlarging the side face (8,9), said ground-facing link part not including any lateral projections, wherein the troughs (10) arranged on the at least one side face (8,9) are open at their ends confronting the contact face (11), but closed at their ends confronting the receiving orifices (6,7).

7. A stud or web link for tire chains, with at least one receiving orifice for the connection of connecting links, with a tire-facing link part and with a ground-facing link part, wherein at least one side face (8,9) of the ground-facing link part (1) defines a plurality of troughs (10) serving for enlarging the side face (8,9), said ground-facing link part not including any lateral projections, wherein its contact face (11) confronting the ground is likewise equipped with a plurality of troughs (13), and wherein its at least one side face (8,9) is equipped with troughs (10) open on two sides, whereas its contact face (11) is equipped with troughs (13) open on only one side.

8. A link as claimed in claim 4 wherein the troughs (13) in the contact face are designed as blind holes.

9. A link as claimed in claim 1 wherein its troughs (10) arranged on the side face form a grooving.

10. A link as claimed in claim 1 wherein the depth (T) of the troughs (10) arranged on the side face (8,9) is at most equal to the distance (A) between successive troughs (10) arranged on the side face.

11. A link as claimed in claim 1 wherein the depth (T) of the troughs (1) arranged on the side face (8,9) is at most equal to the mean width ($B_M$) of the troughs (10) arranged on the side face.

12. A link as claimed in claim 1, wherein the length (L) of the troughs (10) arranged on the side face (8, 9) is greater than their mean width ($B_M$).

13. A link as claimed in claim 1 wherein a surface portion (12) of the ground facing link part (1) which confronts the at least one receiving orifice (6,7) is free of troughs (10) over an entire width ($B_B$) of the ground facing link part.

14. A link as claimed in claim 1, wherein its ground-facing link part (1) is wider than its tire-facing link part (2).

15. A link as claimed in claim 1, wherein the ground-facing link part (1) and the tire-facing link part (2) are connected to one another via studs (3, 4, 5) which enclose two receiving orifices (6, 7) between them and the width ($B_S$) of which is less than the width ($B_R$) of the tire-facing link part (2).

16. A stud or web link for tire chains, with at least one receiving orifice for the connection of connecting links, with a tire-facing link part and with a ground-facing link part, wherein at least one side face (8,9) of the ground-facing link part (1) defines a plurality of troughs (10) serving for enlarging the side face (8,9), said ground-facing link part not including any lateral projections, wherein the tire-facing link part (2) and the ground-facing link part (1) are made identical.

17. A link as claimed in claim 1 which is edge-hardener or case-hardened.

18. A link as claimed in claim 2, wherein there are two mutually opposite side faces, and troughs (10) located on said opposite side faces (8,9) are arranged offset relative to one another.

* * * * *